US012668680B2

(12) United States Patent
Yoshimoto

(10) Patent No.: US 12,668,680 B2
(45) Date of Patent: Jun. 30, 2026

(54) FIXING BELT

(71) Applicant: I.S.T CORPORATION, Otsu (JP)

(72) Inventor: Akimasa Yoshimoto, Kusatsu (JP)

(73) Assignee: I.S.T CORPORATION, Otu (JP)

( * ) Notice: Subject to any disclaimer, the term of this patent is extended or adjusted under 35 U.S.C. 154(b) by 907 days.

(21) Appl. No.: 17/906,830

(22) PCT Filed: Oct. 23, 2020

(86) PCT No.: PCT/JP2020/039894
§ 371 (c)(1),
(2) Date: Sep. 20, 2022

(87) PCT Pub. No.: WO2021/192379
PCT Pub. Date: Sep. 30, 2021

(65) Prior Publication Data
US 2023/0151182 A1 May 18, 2023

(30) Foreign Application Priority Data

Mar. 25, 2020 (JP) .................................. 2020-054036

(51) Int. Cl.
| | |
|---|---|
| *C08K 3/04* | (2006.01) |
| *C08G 73/10* | (2006.01) |
| *C08K 7/18* | (2006.01) |
| *G03G 15/20* | (2006.01) |

(52) U.S. Cl.
CPC ............ *C08K 3/04* (2013.01); *C08G 73/1032* (2013.01); *C08G 73/1042* (2013.01); *C08G 73/1071* (2013.01); *C08K 7/18* (2013.01); *G03G 15/2057* (2013.01); *C08K 2201/001* (2013.01); *C08K 2201/005* (2013.01)

(58) Field of Classification Search
CPC ...... C08K 3/04; C08K 7/18; C08K 2201/001; C08K 2201/005; C08K 3/36; C08K 7/00; C08K 7/08; C08K 7/04; C08K 2003/2227; C08K 2003/2241; C08K 2201/009; C08G 73/1032; C08G 73/1042; C08G 73/1071; G03G 15/2057; G03G 15/2003; C08L 79/08
See application file for complete search history.

(56) References Cited

U.S. PATENT DOCUMENTS

| | | | |
|---|---|---|---|
| 9,342,007 B2 | 5/2016 | Takeda et al. | |
| 2010/0055365 A1 | 3/2010 | Nakajima et al. | |
| 2011/0293989 A1 | 12/2011 | Hasegawa et al. | |
| 2012/0170958 A1 | 7/2012 | Nakajima et al. | |
| 2014/0348559 A1* | 11/2014 | Miyahara .................. | B32B 7/00 399/329 |
| 2016/0041513 A1 | 2/2016 | Takeda et al. | |
| 2016/0223968 A1* | 8/2016 | Nakajima .......... | G03G 15/2057 |
| 2020/0292973 A1* | 9/2020 | Furuichi ............ | G03G 15/2053 |

FOREIGN PATENT DOCUMENTS

| | | |
|---|---|---|
| EP | 2072581 | 6/2009 |
| JP | H07-186162 | 7/1995 |
| JP | H10-063123 | 3/1998 |
| JP | 2006-330405 | 12/2006 |
| JP | 2010-139925 | 6/2010 |
| JP | 2014-191023 | 10/2014 |
| JP | 2016-040600 | 3/2016 |
| KR | 2008-0034278 | 4/2008 |
| WO | 2010/090340 | 8/2010 |

OTHER PUBLICATIONS

International Search Report of PCT/JP2020/039894 and written opinion, Dec. 28, 2020, 12 pages including English translation of the search report.

* cited by examiner

*Primary Examiner* — Andrew J. Oyer
(74) *Attorney, Agent, or Firm* — HSML P.C.

(57) ABSTRACT

An objective of the present invention is to provide a fixing belt having excellent thermal conductivity and capable of suppressing a torque increase in long-term use. The fixing belt of this invention has a base layer including a polyimide resin, a thermal conductive filler, and a wear-resistant filler, the old Mohs hardness of the wear-resistant filler is 5 or more, the thermal conductivity of the base layer is 0.7 W/mK or more, and the inner surface roughness Rz of the base layer in a sliding direction is 2.0 μm or less.

20 Claims, No Drawings

FIXING BELT

TECHNICAL FIELD

The present invention relates to a fixing belt mounted on an image forming apparatus and the like.

BACKGROUND OF THE INVENTION

In an image forming apparatus such as a copying machine or a printer using an electrophotographic method, an unfixed toner image formed on a recording medium such as a recording paper is fixed by a fixing device. In the fixing device of the image forming apparatus of this type, a transfer sheet in which the thermal ink is temporarily fixed on the surface of the fixing belt side is fed to between the fixing belt in which the heater is installed on the back side and the press roller, and the thermal ink is firmly fixed by melting and fixing the thermal ink to the transfer sheet and pressing the thermal ink.

Incidentally, in order to improve the thermal conductivity of the fixing belt to improve the fixing property, and to achieve shortening the waiting time after the power is turned on, reducing the power consumption, increasing the fixing speed, and the like, a method is known in which a filler having excellent thermal conductivity (a high thermal conductivity filler) is contained in the base layer of the fixing belt. For example, as such a method, there has been proposed a method of "blending 1 to 25 parts by volume of a filler having a thermal conductivity exceeding a 60 W/mk in a resin tubular material based on a heat-resistant resin" (for example, see Japanese Unexamined Patent Application Publication No. 2006-330405 and the like).

PRIOR ART DOCUMENT

Patent Document

[Patent DOCUMENT 1] JP-A-2006-330405

SUMMARY OF THE INVENTION

Problem to be Solved by the Invention

However, in case that a base material is manufactured using such a high thermal conductivity filler, when the base material is used for a long period of time in an application in which printing speed is required to be improved, the base material itself is scraped by the guide portion of the heater, shavings of the base material are mixed into the grease provided on the inner surface of the fixing belt, the function of the grease is deteriorated, the torque of the fixing belt is increased, and the like problems occur. Therefore, there is a demand for a fixing belt that can suppress the increase in torque caused by the scraping of the base material while maintaining thermal conductivity.

An object of the present invention is to provide a fixing belt having excellent thermal conductivity and capable of suppressing a torque increase in long-term use.

Means for Solving the Problems

A fixing belt of the present invention contains at least a polyimide resin, a thermal conductive filler, and a wear-resistant filler in a base layer. The thermal conductive filler referred to here can control the thermal conductivity of the base layer to 0.7 W/mK or more, the wear-resistant filler has an old Mohs hardness of 5 or more. The base layer obtained by them is hard to be scraped and can retain the function of grease The inner surface roughness Rz of the base layer in a sliding direction is 2.0 μm or less.

In the fixing belt of the present invention, it is preferable that the diameter (particle diameter) of the wear-resistant filler is in a range of 0.1 μm or more and 10 μm or less, and the additive amount of the wear-resistant filler to the base layer is in a range of 0.1 part by volume or more and 10 parts by volume or less.

In the fixing belt of the present invention, it is preferable that the wear-resistant filler has any of a plate shape, a needle shape, and a spherical shape.

In the fixing belt of the present invention, it is preferable that the diameter (particle diameter) of the thermal conductive filler is in a range of 0.1 μm or more and 10 μm or less, and the additive amount of the thermal conductive filler is in a range of 5 parts by volume or more and 50 parts by volume or less.

In the fixing belt of the present invention, it is preferable that the old Mohs hardness of the wear-resistant filler is in a range of 5 or more and 9 or less.

In the fixing belt of the present inventive, it is preferable that the thermal conductivity of the base layers is in a range of 0.7 W/mK or more and 2.5 W/mK or less.

In the fixing belt of the present invention, it is preferable that the inner surface roughness Rz of the base layer in the sliding direction is in a range of 0.3 μm or more and 2.0 μm or less.

In the fixing belt of the present invention, it is preferable that the elongation of the base layer is in a range of 2% or more and 20% or less.

In the fixing belt of the present invention, it is preferable that the piercing strength of the base layer is in a range of 0.9 kgf or more and 2.0 kgf or less.

Effect of the Invention

The fixing belt of the present invention is excellent in thermal conductivity, and it is possible to suppress a torque increase in long-term use.

MODE FOR CARRYING OUT THE INVENTION

The fixing belt according to the embodiment of the present invention has a base layer containing a polyimide resin, a thermal conductive filler, and a wear-resistant filler, the old Mohs hardness of the wear-resistant filler is 5 or more, the thermal conductivity of the base layer is 0.7 W/mK or more, and the inner surface roughness Rz of the base layer in a sliding direction is 2.0 μm or less.

The fixing belt according to the present embodiment is preferably an endless belt.

The fixing belt according to the present embodiment has the above-described configuration, so that the thermal conductivity is high, the inner surface of the belt is prevented from being scraped and an increase in torque can be prevented.

The reason is inferred as follows.

In the fixing belt according to the present embodiment, since the thermal conductivity is improved by the thermal conductive filler, and the old Mohs hardness of the wear-resistant filler is 5 or more, the scraping of the base layer is suppressed by the wear-resistant filler existing on the inner surface side, and an increase in torque due to the scraping of the base layer can be suppressed. Therefore, more preferably the old Mohs hardness is in a range of 5 or more and 9 or less, and more preferably in a range of 6 or more and 9 or less. Further, by the inner surface roughness Rz of the base layer in the sliding direction is 2.0 μm or less, it is possible to reduce the frictional force and the like of the guide portion of the heater with respect to the base layer, more it seems to be possible to suppress the scraping of the base layer. Further, by optimizing the inner surface roughness Rz along the sliding direction of the fixing belt (the rotation direction of the fixing belt), it is possible to further reduce the frictional force and the like of the fixing belt with respect to the heater guide portion. Here, such an inner surface roughness Rz is preferably 1.7 μm or less, more preferably 1.5 μm or less. Note that the inner surface roughness Rz is preferably 0.3 μm or more, more preferably 0.4 μm or more, and still more preferably 0.5 μm or more.

If the thermal conductivity of the base layers of the fixing belts of the present. embodiment is 0.7 W/mK or more, it is preferable to increase the fixing rate of the fixing device, more preferably 0.7 W/mK or more and 2.5 W/mK or less, still more preferably in a range of 0.9 W/mK or more and 2.5 W/mK or less, and still more preferably in a range of 1.0 W/mK or more and 2.2 W/mK or less.

As the thermal conductive filler, it is possible to use graphite, boron nitride, a carbon nanotube and the like. The thermal conductive filler is preferably plate-like or needle-like in order to have high thermal conductivity with a small additive amount. Further, the diameter (particle diameter) of the thermal conductive filler is preferably in a range of 0.1 μm or more and 10 μm or less, more preferably in a range of 1 μm or more and 10 μm or less, more preferably in a range of 2 μm or more and 8 μm or less. Here, the diameter (particle diameter) indicates the longest diameter in the case of a needle-like or plate-like shape.

Further, the wear-resistant filler having an old Mohs hardness of 5 or more used in this embodiment is preferably an inorganic particle, and is, for example, silicon oxide (fused silica), magnesium oxide, titanium oxide, crystalline silica, silicon carbide, aluminum nitride, fused silica, silicon nitride, aluminum oxide, beryllia, alumina and the like. Further, it is preferable that these wear-resistant filler is spherical, plate-like, and needle-like in shape. Further, it is preferable that the diameter (particle diameter) of the wear-resistant filler is in a range of 0.1 μm or more and 10 μm or less in order to control the dispersibility and the inner surface roughness of the base layer. Further, the diameter (particle diameter) of the wear-resistant filler is preferably in a range of 0.2 μm or more and 10 μm or less, more preferably in a range of 0.2 μm or more and 7 μm or less, and still more preferably in a range of 0.2 μm or more and 5 μm or less. Further, if the wear-resistant filler has a plate shape, a needle shape, or a spherical shape, it is possible to make the base layer difficult to be scraped. For this reason, it is preferable that the wear-resistant filler has such a shape. Incidentally, even when the wear-resistant filler exhibits the above-mentioned shape, a degree to scrape the base layer depends on the shape of the wear-resistant filler, and the preferable diameter (particle diameter) is also different depending on the shape. When the wear-resistant filler is plate-like or needle-like, the wear-resistant filler tends to be oriented on the surface of the base layer, so that even if the diameter is large, the surface of the base layer is hardly roughened and the base layer is hardly scraped. That is, when a plate-like or needle-like wear-resistant filler is used, it is easy to select a wear-resistant filler having a large diameter. However, if the diameter is too large, it is difficult to maintain the mechanical characteristics necessary for the fixing belt, which is not preferable. In view of such circumstances, the diameter of the plate-shaped wear-resistant filler is preferably in a range of 0.1 μm or more and 10 μm or less, and the diameter of the needle-shaped wear-resistant filler is preferably in a range of 0.1 μm or more and 7 μm or less. On the other hand, when the wear-resistant filler has a spherical shape, if the diameter of the wear-resistant filler is large, the surface of the base layer is liable to be roughened and the base layer is liable to be scraped. That is, when a spherical wear-resistant filler is used, it is preferable to reduce the diameter of the wear-resistant filler. Specifically, the diameter of the spherical wear-resistant filler is preferably in a range of 0.1 μm or more and 5 μm or less.

Further, the elongation of the base layer of the fixing belt according to the present embodiment is preferably in a range of 2% or more and 20% or less, more preferably in a range of 3% or more and 20% or less, and still more preferably in a range of 5% or more and 20% or less. When the elongation rate is in the range of 2% or more and 20% or less, it is excellent in flexibility.

Further, the piercing strength of the base layer of the fixing belt according to the present embodiment is preferably in a range of 0.9 kgf or more and 2.0 kgf car less, more preferably in a range of 1.0 kgf or more and 1.7 kgf or less, and still more preferably in a range of 1.1 kgf or more and 1.4 kgf or less. The piercing strength of the base layer is in a range of 0.9 kgf or more and 2.0 kgf or less, which is excellent in mechanical properties of the fixing belt.

Next, examples of the polyimide resin used for forming the fixing belt according to the present embodiment include an imidized product of a polyamic acid which is a polymer of a tetracarboxylic dianhydride and a diamine compound. Specific examples of the polyimide resin include those obtained by subjecting an equimolar amount of a tetracarboxylic dianhydride and a diamine compound to a polymerization reaction in a solvent to obtain a polyamic acid solution, and imidizing the polyamic acid.

Specific examples of the tetracarboxylic dianhydride include aromatic tetracarboxylic dianhydride such as pyrotnellitic dianhydride (PMDA), 1,2,5,6-naphthalenetetracarboxylic dianhydride, 1,4,5,8-naphthalenetetracarboxylic dianhydride, 2,3,6,7-naphthalenetetracarboxylic dianhydride, 2,2',3,3'-biphenyltetracarboxylic dianhydride, 2,3,3', 4'-biphenyltetracarboxylic dianhydride, 3,3',4,4'-biphenyltetracarboxylic dianhydride (BPDA), 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis[3,4-(dicarboxyphenoxy)phenyl]propane dianhydride (BPADA), 4,4'-(hexafluoroisopropylidene)diphthalic anhydride, oxydiphthalic anhydride (ODPA), bis(3,4-dicarboxyphenyl) sulfone dianhydride, bis(3,4-dicarboxyphenyl)sulfoxide dianhydride, thiodiphthalic dianhydride, 3,4,9,10-perylenetetetracarboxylic dianhydride, 2,3,6,7-anthracenetetracarboxylic dianhydride, 1,2,7,8-phenanthrenetetracarboxylic dianhydride, 9,9-bis(3,4-dicarboxyphenyl)fluorene dianhydride, 9,9-bis[4-(3,4'-dicarboxyphenoxy)phenyl]fluorene dianhydride, and the like, and additionally cyclobutane tetracarboxylic dianhydride, 1,2,3,4-cyclopentanetetracarboxylic dianhydride, 2,3,4,5-tetrahydrofuran tetracarboxylic dianhydride, 1,2,4,5-cyclohexanetetracarboxylic dianhydride, 3,4-dicarboxy-1-cyclohexylsuccinic dianhydride, 3,4-dicarboxy-1,2,3,4-tetrahydro-1-naphthalenesuccinic acid dianhydride. It is to be noted that 2 or more of these tetracarboxylic dianhydrides may be mixed and used. Among these tetracarboxylic acid dianhydrides, pyromellitic acid dianhydride (PMDA), 3,3',4,4'-biphenyltetracarboxylic acid dianhydride (BPDA), 3,3',4,4'-benzophenontetctracarboxylic acid dianhydride (BTDA), 2,2-bis[3,4-(dicarboxyphenoxy)phenyl]propane dianhydride (BPADA), oxydiphthalic acid anhydride (ODPA) are particularly preferred.

Specific examples of the diamines compound include aromatic diamines such as para-phenylenediamine (PPD), inetaphenylenediamine (MPDA), 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, 2,2-bis(trifluoromethyl)-4,4'-diaminobiphenyl, 3,3'-diaminodiphenylmethane, 4,4'-diaminodiphenylmethane (MDA), 2,2-bis-(4-aminophenyl)propane, 3,3'-diaminodiphenylsulfone (33DDS), 4,4'-diaminodiphenylsulfone (44DDS), 3,3'-diaminodiphenylsufide, 4,4'-diaminodiphenylsufide, 3,3'-diaminodiphenylether, 3,4'-diaminodiphenylether (34ODA), 4,4'-diaminodiphenylether (ODA), 1,5-diaminonaphthalene, 4,4'-diaminodiphenyldiethylsilane, 4,4'-diaminodiphenylsilane, 4,4'-diaminodiphenylethylphosphine oxide, 1,3-bis(3-aminophenoxy)benzene (133APB), 1,3-bis(4-aminophenoxy)benzene (134APB), 1,4-bis(4-aminophenoxy)benzene, bis[4-(3-aminophenoxy)phenyl]sulfone (BAPSM), bis[4-(4-aminophenoxy)phenyl]sulfone (BAPS), 2,2-bis[4-(4-aminophenyl)phenyl]propane (BAPP), 2,2-bis(3-aminophenyl)1,1,1,3,3,3-hexafluoropropane, 2,2-bis(4-aminophenyl)1,1,1,3,3,3-hexafluoropropane, 9,9-bis(4-aminophenyl)fluorine and the like. It is to be noted that 2 or more of these diamine compounds may be mixed and used in any way.

As the polyimide resin, from the viewpoint of durability, thermal conductivity, and bending, durability, a polyimide resin composed of 3,3', 4,4'-biphenyltetracarboxylic dianhydride and p-phenylenediamine (BPDA-PPD), or a polyimide resin composed of 3,3',4,4'-biphenyltetracarboxylic dianhydride and 4,4'-diaminodiphenyl ether (BPDA-ODA), or a polyimide resin composed of pyromellitic dianhydride and 4,4'-diaminodiphenyl ether (PMDA-ODA) is preferred. Further, these polyimide resins may be combined.

Configuration of Fixing Belt

The fixing belt according to the embodiment of the present invention is mainly composed of a base layer, a primer layer and a release layer. Hereinafter, these constituent layers will be described in detail.
(1-1) Base Layer The base layer is a seamless tubular layer and is formed primarily of polyimide resin, thermal conductive filler, and wear-resistant filler. In the fixing belt according to the embodiment of the present invention, the thickness of the base layer is preferably in a range of 30 μm or more and 100 μm or less from the viewpoint of mechanical properties and the like, and more preferably in a range of 50 μm or more and 80 μm or less in consideration of ease of manufacture and flexibility required for the fixing belt.

In order to suppress the deterioration of the mechanical properties and the scraping of the base layer while setting the thermal conductivity of the base layer to 0.7 W/mK or more, it is preferable that the additive amount of the thermal conductive filler is in a range of 5 parts by volume or more and 50 parts by volume or less, more preferably in a range of 7 parts by volume or more and 50 parts by volume or less, and still more preferably in a range of 14 parts by volume or more and 30 parts by volume or less.

Similarly, in order to suppress scraping of the base layer while maintaining the thermal conductivity and mechanical properties of the base layer, the additive amount of the wear-resistant filler is preferably in a range of 0.1 part by volume or more and 10 parts by volume or less, more preferably in a range of 0.5 part by volume or more and 8 parts by volume or less, more preferably in a range of 0.5 part by volume or more and 5 parts by volume or less, and particularly preferably in a range of 1 part by volume or more and 5 parts by volume or less.
(1-2) Primer Layer The primer layer is a layer serving to bond the base layer and the release layer, and is composed of a fluororesin, an adhesive resin such as an acrylic resin and the like, a water-soluble heat-resistant resin such as a water-soluble polyamideimide resin and a water-soluble polyimide resin and the like. In addition, in the fixing belt according to the embodiment of the present invention, the thickness of the primer layer may be as thick as possible to be bonded, and is adjusted to be in a range of 1 μm or more and 10 μm or less and the like.
(1-3) Release Layer The release layer is preferably formed from at least one selected from the group consisting of a fluororesin, a silicone rubber, and a fluororubber, and is preferably formed from a fluororesin from the viewpoint of releasability against a toner and the like. Examples of the fluororesin include polytetrafluoroethylene (PTFE), tetrafluoroethylene-perfluoroalkyivinyl ether copolymer (PFA), tetrafluoroethylene-hexafluoropropylene copolymer (FEP). These may be utilized alone or may be mixed and utilized. Further, it is preferable that the release layer has a thickness in a range of 6 μm or more and 35 μm or less.

An Example of a Method for Manufacturing a Fixing Belt

The fixing belt according to the present embodiment is manufactured through mainly a polyimide precursor solution preparation step, a base layer molding step, a primer layer forming step, a release layer forming step, a baking step and a mold removal step. However, the present manufacturing method is merely an example, and the present invention is not limited. Hereinafter, each of the above manufacturing steps will be described in detail.
(1) Polyimide Precursor Solution Preparation Step In the polyimide precursor solution preparation step, the above-described thermal conductive filler and the wear-resistant filler are added to the polyimide precursor solution prepared as follows to obtain a filler-containing polyimide precursor solution. The method of adding the thermal conductive filler and the wear-resistant filler to the polyimide precursor solution is not particularly limited, and the method of directly adding the thermal conductive filler and the wear-resistant filler to the polyimide precursor solution may be acceptable, of course, the method of adding the thermal conductive filler and the wear-resistant filler during the preparation of the polyimide precursor solution may be acceptable.

Examples of the organic polar solvent capable of preparing the above polyimide precursor solution include N,N-dimethylformamide, N,N-dimethylacetamide, N,N-diethyl-acetamide, N-methyl-2-pyrrolidone, 1,3-dimethyl-2-imidazolidinone, N-methylcaprolactam, hexamethylphosphoric triamide, 1,2-dimethoxyethane, diglyme, triglyme and the like. Among these diamines, particularly, N,N-dimethylacetamide (DMAC), N-methyl-2-pyrrolidone (NMP) is preferred, Note that these organic polar solvents may be used alone or in combination. In addition, an aromatic hydrocarbon such as toluene or xylene and the like may be mixed in this organic polar solvent.

In this embodiment, it is preferable to use 4,4'-diaminodiphenylether as the diamine and pyromellitic dianhydride as the tetracarboxylic acid dianhydride, and it is particularly preferable to use para-phenylenediamine as the diamine and 3,3',4,4'-biphenyltetracarboxylic acid dianhydride as the tetracarboxylic acid dianhydride. This is because the polyimide resin obtained from these monomers is excellent in mechanical properties and tough, and does not soften or melt like a thermoplastic resin even if the temperature of the fixing belt increases, and exhibits excellent heat resistance and mechanical properties.

Further, if necessary, a resin such as polyamideimide, polyethersulfone and the like may be added to this polyimide precursor solution within a range not impairing the essence of the present invention.

To the polyimide precursor solution, well-known additives such as dispersants, solid lubricants, precipitation inhibitors, leveling agents, surface regulators, moisture absorbers, gelation inhibitors, antioxidants, ultraviolet absorbers, light stabilizers, plasticizers, skin coating inhibitors, surfactants, antistatic agents, antifoaming agents, antimicrobial agents, fungicides, preservatives, thickeners, and the like may be added within a range that does not impair the properties of the present invention. Further, a dehydrating agent and an imidization catalyst having a stoichiometry or more may be added to this polyimide precursor solution.

In addition, it is preferable that the polyimide precursor solution be subjected to a treatment such as filtration and defoaming in advance in use.

(2) Base Layer Molding Process

In the base layer molding step, a polyimide precursor solution is uniformly applied to an outer peripheral surface of a cylindrical core body using a ring-shaped die, and then the core body with the coating film is heated. Note that the heating temperature at this time is preferably a temperature at which an organic polar solvent volatilizes but imidization does not proceed, for example, a temperature of 200° C. or less, but may be increased stepwise to 300° C. to 450° C.

(3) Primer Layer Forming Step

In the primer layer forming step, a primer liquid is uniformly applied to an outer peripheral surface of a base layer by dipping a core body having a base layer formed thereon into a primer liquid containing a dispersoid containing a fluororesin, a water-soluble heat-resistant resin described above, and the like. Then, the base layer with the coating film (with the core body) is heated. Note that the heating temperature at this time is preferably a temperature at which the solvent volatilizes but the imidization of the previous polyimide precursor does not proceed, for example, a temperature in a range of 200° C. or less.

(4) Release Layer Forming Process

In the release layer forming step, after the fluororesin dispersion liquid is applied, the coating film is dried to form a coating film of the fluororesin dispersion liquid on the primer layer.

(5) Baking Step

In the baking step, the one obtained in the release layer forming step is baked to obtain a fixing belt. The baking temperature at this time is preferably a temperature in a range of 300° C. or higher and 450° C. or less. Further, it is preferable that the treatment time is in a range of 30 minutes or more and 2 hours or less. This is because the completion of the imidization of the base layer and the baking of the fluororesin of the release layer are performed simultaneously, and not only the shortening of the manufacturing time of the fixing belt and the improvement of the thermal efficiency can be realized, but also the adhesion of each layer can be enhanced.

(6) Mold Removal Step

In the mold removal step, the fixing belt is extracted from the core body.

Design Philosophy of Fixing Belt

In the image forming apparatus using the conventional fixing belt, the fixing belt melts and fixes the toner onto a recording medium such as paper. At that time, the guide portion of the heater provided inside the fixing belt and the base layer of fixing belt contact with each other, and the base layer is scraped by friction. At this time, the friction or the like applied to the base layer of the fixing belt is the resultant force of the force in the film thickness direction of the fixing belt and the force in the sliding direction. In the fixing belt of the present embodiment, since the surface hardness of the base layer is increased by adding the wear-resistant filler having the old Mohs hardness of 5 or more to the base layer, it is effective against friction in the film thickness direction of the base layer. However, when the filler having high old Mohs hardness is included, unevenness is formed on the inner surface of the base layer, and when the inner surface roughness Rz in the sliding direction is too large, the wear-resistant filler itself is released by the force in the sliding direction, so that the base layer is easily scraped. Therefore, as the fixing belt, a wear-resistant filler having an old Mohs hardness of 5 or more is added, and the inner surface roughness Rz in the sliding direction is controlled to be 2.0 or less.

In the fixing belt of the present embodiment, an elastic layer may be provided between the base layer and the release layer.

WORKING EXAMPLES AND COMPARATIVE EXAMPLES

Hereinafter, the fixing belt according to the present embodiment will be described in more detail with reference to working examples and comparative examples. The present invention is not limited by these working examples and comparative examples.

Working Example 1

1. Production of Fixing Belt

First, a mold having an outer diameter of 18 mm and a length of 500 mm, which had been subjected to mold release treatment on the surface, was prepared.

Next, a graphite (diameter: 2 μm, shape: plate-like) as a thermal conductive filler was added into a polyamic acid solution (composition: 3,3',4,4'-biphenyltetracarboxylic acid dianhydride (BPDA)/para-phenylenediamine (PPD):pyromellitic dianhydride (PMDA)/4,4'-diaminodiphenyl ether (ODA)=8:2, solids content: 18.4 parts by weight) so that the graphite occupied 26.5 parts by volume to the solids content of the polyamic acid solution, and then the polyamic acid solution was stirred until the graphite became uniform, and then, a titanium oxide (diameter: 0.2 μm, shape: sphere-like) having an old Mohs hardness of 7 as a wear-resistant filler was added into the polyamic acid solution so that the titanium oxide occupied 3.0 parts by volume to the solids content of the polyamic acid solution, and then the polyamic acid solution was stirred until the titanium oxide became uniform, and a filler-containing polyimide precursor solution with a viscosity of 1000 poise was obtained.

Then, after the filler-containing polyimide precursor solution was applied to the outer surface of the mold by immersing the mold into the filler-containing polyimide precursor solution to a portion of 400 mm, a ring-shaped die having an inner diameter of 19.4 mm was dropped from the upper end of the mold by its own weight to cast and mold a filler-containing polyimide precursor solution on the surface of the mold. Thereafter, the mold was placed in an oven at 120° C. as a drying step, after drying for 30 minutes, the temperature was raised in 20 minutes to a temperature of 200° C., held at the same temperature for 20 minutes, cooled to room temperature to prepare a base layer.

Subsequently, the primer liquid was applied to the surface of the base layer and dried at 150° C. for 10 minutes to form a primer layer.

Thereafter, the PFA dispersion was coated on the primer layer so that coating had a thickness of 12 μm after baking. Then, after it is dried at ordinary temperature for 30 minutes, the temperature was increased stepwise to 350° C., and it was baked at 350° C. for 30 minutes to obtain a target fixing belt having base layer thickness of 60 μm.

2. Evaluation of Physical Properties (1) Surface Roughness of the Inner Surface of the Base Layer When the surface roughness Rz of the inner surface of the base layer of the fixing belt produced as described above was measured at any six points in the sliding directions under the condition of the feeding speed: 0.1 mm/sec, the cutoff: 0.8 mm, and the measuring length: 2.5 mm according to JIS B0601-1994, the mean of the surface roughness Rz was 0.51 μm.

(2) Confirming the Degree to be Scraped of the Base Layer

As a result of confirming the degree to be scraped of the base layer after the fixing belt of this working example was incorporated into a fixing device of a printer and the fixing belt was rotated 60000 times, it was confirmed that the fixing belt was not scraped as compared with the fixing belt that does not include the wear-resistant filler (the fixing belt manufactured without the wear-resistant filler in the above-described manufacturing method of the fixing belt).

(3) Measurement of the Thermal Conductivity of the Base Layer

Referring to JIS R2616, only the base layer of the fixing belt was cut into 2 cm×2 cm pieces, a transistor is provided on one surface of the base layer through a thermal conductive grease, and a heat sink (made of aluminum) is provided on the opposite surface through a thermal conductive grease. Then, after the temperature of the transistor is raised by applying a current until it becomes 60° C., the base layer is heated at 60° C. for 3 minutes, the temperature A of the transistor surface, and the temperature B of the surface of the base layer provided with a heat sink was measured using a thermocouple. Further, the power consumption is also measured at that time, using the temperature and power consumption of each surface, thermal resistance was calculated from the following equation.

$$\text{Thermal resistance} = (\text{temperature A of the transistor surface temperature B of the surface of the base layer})/\text{power consumption}$$

Further, using the thermal resistance calculated above, thermal conductivity was calculated from the following equation.

$$\text{Thermal conductivity} = \text{film thickness of the base layer}/(\text{cross-sectional area of the transistor} \times \text{thermal resistance})$$

Incidentally, the thermal conductivity of the base layer of the fixing belt according to this working example was 1.18 W/mK.

(4) Measurement of Elongation

Preparation of a primer layer and application of a PFA dispersion were omitted in "1. Production of fixing belt" described above, and only the base layer was stepwise raised to 350° C. and baked at 350° C. for 30 minutes to obtain a base layer as a single substance.

After the obtained base layer was cut open, the base layer was punched out longitudinally with a JIS-3 dumbbell (JIS K6301) to prepare a sample. The sample was tested at a chuck spacing distance 30 mm and a tensile rate 50 mm/min using an autograph AGS-50A manufactured by Shimadzu Corporation, and tensile elongation at break is recorded as elongation. Note that the elongation of the base layer according to this working example was 6.6%.

(5) Measurement of Piercing Strength

Preparation of a primer layer and application of a PFA dispersion were omitted in "1. Production of fixing belt" described above, and only the base layer was stepwise raised to 350° C. and baked at 350° C. for 30 minutes to obtain a base layer as a single substance.

The obtained base layer was set in a fixing jig. Using an autograph AGS-50A manufactured by Shimadzu Corporation, the base layer was pierced with a piercing needle (made by Imada/TKS-250N) according to JIS Z1707 1997 at a test rate of 5 mm/min, and the test force at the time of rupture was measured to obtain the piercing strength. The piercing strength of the base layer according to this working example was 1.2 kgf.

Working Example 2

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.04 W/mK, the roughness Rz was 1.11 μm, the piercing strength was 1.4 kgf, and the elongation was 9.7%.

Further, as a result of confirming the degree to be scraped of the base layer after the fixing belt of this working example was incorporated into a fixing device of a printer and the fixing belt was rotated 60000 times in the same mariner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 3

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to alumina (diameter: 5 μm, shape: plate-like) having an old Mohs hardness of 9 and the alumina was added to the polyamic acid solution so that the alumina occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.89 W/mK, the roughness Rz was 1.1102 μm, the piercing strength was 1.7 kgf, and the elongation was 5.9%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 4

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 21.5 parts by volume with respect to the solid content of the polyamic acid solution, the wear-resistant filler was changed to titanium oxide (diameter: 1 μm, shape: sphere-like) having an old Mohs hardness of 7 and the titanium oxide was added to the polyamic acid solution so that the titanium oxide occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.14 W/mK, the roughness Rz was 0.70 μm, the piercing strength was 1.5 kgf, and the elongation was 6.8%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 5

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 15.0 parts by volume with respect to the solid content of the polyamic acid solution, the wear-resistant filler was changed to titanium oxide (diameter: 5 μm, shape: needle-like) having an old Mohs hardness of 7 and the titanium oxide was added to the polyamic acid solution so that the titanium oxide occupied 8.0 parts by volume with respect to the solid content of the polyamic acid solution.

When the physical properties of the obtained fixing belt and the base layer were measured by the same method as that used in the WORKING EXAMPLE 1, the thermal conductivity was 0.94 W/mK, the roughness Rz was 1.39 μm, the piercing strength was 1.1 kgf, and the elongation was 8.2%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 6

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to titanium oxide (diameter: 1 μm, shape: sphere-like) having an old Mohs hardness of 7 and the titanium oxide was added to the polyamic acid solution so that the titanium oxide occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.21 W/mK, the roughness Rz was 1.25 μm, the piercing strength was 1.1 kgf, and the elongation was 9.9%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 7

A fixing belt was obtained in the same manner as in the WORKING EXAMPLE 1 except that the thermal conductive filler as changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 2 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.18 W/mK, the roughness Rz was 1.26 μm, the piercing strength was 1.2 kgf, and the elongation was 8.8%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 8

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 7 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.22 W/mK, the roughness Rz was 1.43 μm, the piercing strength was 1.0 kgf, and the elongation was 8.7%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 9

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.80 W/mK, the roughness Rz was 0.61 μm, the piercing strength was 1.3 kgf, and the elongation was 4.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 10

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 25.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.32 W/mK, the roughness Rz was 0.55 μm, the piercing strength was 0.9 kgf, and the elongation was 3.1%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 11

A fixing belt was obtained in the same manner as in the WORKING EXAMPLE 1 except that that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to silica (diameter: 0.3 μm, shape: sphere-like) having an old Mohs hardness of 8 and the silica was added to the polyamic acid solution so that the silica occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.78 W/mK, the roughness Rz was 0.54 μm, the piercing strength was 1.8 kgf, and the elongation was 19.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 12

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to titanium oxide (diameter: 5.0 μm, shape: needle-like) having an old Mohs hardness of 7 and the titanium oxide was added to the polyamic acid solution so that the titanium oxide occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.89 W/mK, the roughness Rz was 0.84 μm, the piercing strength was 1.5 kgf, and the elongation was 11.0%.

Further, as a result of confirming the degree to be scraped of the base layer after the fixing belt of this working example was incorporated into a fixing device of a printer and the fixing belt was rotated 60000 times in the same mariner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 13

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to silica (diameter: 0.5 μm, shape: spherical)having an old Mohs hardness of $ and the silica was added to the polyamic acid solution so that the silica occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.79 W/mK, the roughness Rz was 0.51 μm, the piercing strength was 2.0 kgf, and the elongation was 15.8%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 14

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 25.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.27 W/mK, the roughness Rz was 0.56 μm, the piercing strength was 1.1 kgf, and the elongation was 5.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 15

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 14.5 parts by volume with respect to the solid content of the polyamic acid solution, the wear-resistant filler was changed to alumina (diameter: 0.3 μm, shape: sphere-like) having an old Mohs hardness of 9 and the alumina was added to the polyamic acid solution so that the alumina occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 0.87 W/mK, the roughness Rz was 0.61 μm, the piercing strength was 1.7 kgf, and the elongation was 17.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 16

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 22.5 parts by volume with respect to the solid content of the polyamic acid solution, the wear-resistant filler was changed to alumina (diameter: 0.2 μm, shape: plate-like) having an old Mohs hardness of 9 and the alumina was added to the polyamic acid solution so that the alumina occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.15 W/mK, the roughness Rz was 0.56 μm, the piercing strength was 1.2 kgf, and the elongation was 7.1%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 17

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 25.0 parts by volume with respect to the solid content of the polyamic acid solution, the wear-resistant filler was changed to silica (diameter: 0.2 μm, shape: spherical) having an old Mohs hardness of 8 and the silica was added to the polyamic acid solution so that the silica occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.26 W/mK, the roughness Rz was 0.68 μm, the piercing strength was 0.9 kgf, and the elongation was 5.3%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 18

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 22.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.29 W/mK, the roughness Rz was 0.65 μm, the piercing strength was 1.1 kgf, and the elongation vas 6.9%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 19

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 18.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 8.0 parts by volume with respect to the solid content of the polyamic acid solution.

When the physical properties of the obtained fixing belt and the base layer were measured by the same method as that used in the WORKING EXAMPLE 1, the thermal conductivity was 1.21 W/mK, the roughness Rz was 1.05 μm, the piercing strength was 0.8 kgf, and the elongation was 7.0%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 20

A fixing belt was obtained in the same manner as in the WORKING EXAMPLE 1 except that the thermal conductive filler was changed to graphite (diameter: 3 μm, shape: plate-like) and the graphite was added to the polyamic acid solution so that the graphite occupied 20.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.05 W/mK, the roughness Rz was 0.58 μm, the piercing strength was 1.6 kgf, and the elongation was 13.5%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 21

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 17.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 7.5 parts by volume with respect to the solid content of the polyamic acid solution.

When the physical properties of the obtained fixing belt and the base layer were measured by the same method as that used in the WORKING EXAMPLE 1, the thermal conductivity was 1.03 W/mK, the roughness Rz was 1.01 μm, the piercing strength was 1.0 kgf, and the elongation was 9.5%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 22

A fixing belt was obtained in the same manner as in the WORKING EXAMPLE 1 except that the thermal conductive filler was changed to graphite (diameter: 5 μm, shape: plate-like) and the graphite was added to the polyamic acid solution so that the graphite occupied 19.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.15 W/mK, the roughness Rz was 0.92 μm, the piercing strength was 0.9 kgf, and the elongation was 8.1%.

Further, as a result of confirming the degree to be scraped of the base layer after the fixing belt of this working example was incorporated into a fixing device of a printer and the fixing belt was rotated 60000 times in the same mariner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 23

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 18.0 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 1.03 W/mK, the roughness Rz was 0.99 μm, the piercing strength was 1.2 kgf, and the elongation was 12.1%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 24

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 19.5 parts by volume with respect to the solid content of the polyamic acid solution, the wear-resistant filler was changed to titanium oxide (diameter: 0.2 μm, shape: plate-like) having an old Mohs hardness of 7 and the titanium oxide was added to the polyamic acid solution so that the titanium oxide occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.07 W/mK, the roughness Rz was 1.11 μm, the piercing strength was 1.2 kgf, and the elongation was 12.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 25

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 0.2 parts by volume with respect to the solid content of the polyamic acid solution.

When the physical properties of the obtained fixing belt and the base layer were measured by the same method as that used in the WORKING EXAMPLE 1, the thermal conductivity was 1.08 W/mK, the roughness Rz was 1.22 μm, the piercing strength was 1.3 kgf, and the elongation was 13.7%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 26

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 0.5 parts by volume with respect to the solid content of the polyamic acid solution.

When the physical properties of the obtained fixing belt and the base layer were measured by the same method as that used in the WORKING EXAMPLE 1, the thermal conductivity was 1.08 W/mK, the roughness Rz was 1.25 μm, the piercing strength was 1.2 kgf, and the elongation was 14.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 27

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to titanium oxide (diameter: 1 μm, shape: sphere-like) having an old Mohs hardness of 7 and the titanium oxide was added to the polyamic acid solution so that the titanium oxide occupied 1.0 parts by volume with respect to the solid content of the polyamic acid solution.

When the physical properties of the obtained fixing belt and the base layer were measured by the same method as that used in the WORKING EXAMPLE 1, the thermal conductivity was 1.06 W/mK, the roughness Rz was 1.23 μm, the piercing strength was 1.3 kgf, and the elongation was 16.3%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1 it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 28

A fixing belt was obtained in the same manner as in the WORKING EXAMPLE 1 except that PMDA/ODA of the polyamic acid solution was changed to BPDA/ODA, the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to titanium oxide (diameter: 1 μm, shape: spherical) having an old Mohs hardness of 7 and the titanium oxide was added to the polyamic acid solution so that the titanium oxide occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.22 W/mK, the roughness Rz was 1.25 μm, the piercing strength was 1.1 kgf, and the elongation was 8.2%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 29

A fixing belt was obtained in the same manner as in the WORKING EXAMPLE 1 except that PMDA/ODA of the polyamic acid solution was changed to BPDA/ODA, the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.19 W/mK, the roughness Rz was 1.41 μm, the piercing strength was 1.0 kgf, and the elongation was 6.1%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 30

A fixing belt was obtained in the same manner as in the WORKING EXAMPLE 1 except that the thermal conductive filler was changed to graphite (diameter: 8 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.21 W/mK, the roughness Rz was 1.38 μm, the piercing strength was 1.2 kgf, and the elongation was 11.3%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 31

A fixing belt was obtained in the same manner as in the WORKING EXAMPLE 1 except that the thermal conductive filler was changed to graphite (diameter: 10 μm, shape: plate-like) and the graphite was added to the polyamic acid solution so that the graphite occupied 20.5 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.23 W/mK, the roughness Rz was 1.50 μm, the piercing strength was 1.1 kgf, and the elongation was 9.4%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 32

A fixing belt was obtained in the same manner as in the WORKING EXAMPLE 1 except that the thermal conductive filler was changed to carbon nanotube (diameter: 5 μm (×150 nm), shape: needle-like) and the carbon nanotube was added to the polyamic acid solution so that the carbon nanotube occupied 25.0 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 3.0 parts by volume with respect to the solid content of the polyamic acid solution.

When the physical properties of the obtained fixing belt and the base layer were measured by the same method as that used in the WORKING EXAMPLE 1, the thermal conductivity was 1.97 W/mK, the roughness Rz was 1.26 μm, the piercing strength was 1.3 kgf, and the elongation was 6.3%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Working Example 33

A fixing belt was obtained in the same manner as in the WORKING EXAMPLE 1 except that the thermal conductive filler was changed to carbon nanotubes (diameter: 5 μm (×150 nm), shape: needle-like) and the carbon nanotube was added to the polyamic acid solution so that the carbon nanotube occupied 25.0 parts by volume with respect to the solid content of the polyamic acid solution, the wear-resistant filler was changed to alumina (diameter: 10 μm, shape: plate-like) having an old Mohs hardness of 9 and the alumina was added to the polyamic acid solution so that the alumina occupied 5.0 parts by volume with respect to the solid content of the polyamic acid solution.

When the physical properties of the obtained fixing belt and the base layer were measured by the same method as that used in the WORKING EXAMPLE 1, the thermal conductivity was 2.09 W/mK, the roughness Rz was 1.67 μm, the piercing strength was 1.2 kgf, and the elongation was 3.7%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was not scraped as compared with the fixing belt that does not include the wear-resistant filler (the fixing belt manufactured without the wear-resistant filler in the producing method of the fixing belt shown in the WORKING EXAMPLE 1).

Comparative Example 1

1. Production of Fixing Belt

First, a mold having an outer diameter of 18 mm and a length of 500 mm, which had been subjected to mold release treatment on the surface, was prepared.

Next, a carbon nanotube (diameter: 5 μm (×150 nm), shape: needle-like) as a thermal conductive filler was added to a polyamic acid solution (composition: 3,3',4,4'-biphenybetracarboxylic acid dianhydride (BPDA)/para-phenylenediamine (PPD):pyromellitic dianhydride (PMDA)/4,4'-diaminodiphenyl ether (ODA)=8:2, solid content: 18.4 parts by weight) so that the carbon nanotube occupied 25.0 parts by volume to the solids content of the polyamic acid solution, and then the polyamic acid solution was stirred until the carbon nanotube became uniform, and then, a titanium oxide (diameter: 5.0 μm, shape: needle-like) having an old Mohs hardness of 7 as a wear-resistant filler was added into the polyamic acid solution so that the titanium oxide occupied 5.0 parts by volume to the solids content of the polyamic acid solution, and then the polyamic acid solution was stirred until the titanium oxide became uniform, and a filler-containing polyimide precursor solution with a viscosity of 3000 poise was obtained.

Then, after the filler-containing polyimide precursor solution was applied to the outer surface of the mold by immersing the mold into the filler-containing polyimide precursor solution to a portion of 400 mm, a ring-shaped die having an inner diameter of 18.3 mm was dropped from the upper end of the mold by its own weight to cast and mold a filler-containing polyimide precursor solution on the surface of the mold so that final base layer had a thickness of 5 μm after baking. Thereafter, the mold is placed in an oven at 75° C. as a drying step, after drying for 60 minutes, again, the filler-containing polyimide precursor solution was casted and molded on the coating using a ring-shaped die having an inner diameter of 19.3 mm so that final base layer had a thickness of 60 μm after baking. Thereafter, the mold was placed in an oven at 120° C. as a drying step, after drying for 30 minutes, the temperature was raised in 20 minutes to a temperature of 200° C., held at the same temperature for 20 minutes, cooled to room temperature to prepare a base layer.

Subsequently, the primer liquid was applied to the surface of the base layer and dried at 150° C. for 10 minutes to form a primer layer.

Thereafter, the PFA dispersion was coated on the primer layer so that coating had a thickness of 12 μm after baking. Then, after it is dried at ordinary temperature for 30 minutes, the temperature was increased stepwise to 350° C., and it was baked at 350° C. for 30 minutes to obtain a target fixing belt having base layer thickness of 60 μm.

When the physical properties of the obtained fixing belt and the base layer were measured by the same method as that used in the WORKING EXAMPLE 1, the thermal conductivity was 2.03 W/mK, the roughness Rz was 2.10 μm, the piercing strength was 0.8 kgf, and the elongation was 3.2%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was scraped to the same extent as the fixing belt that does not include the wear-resistant filler (the fixing belt manufactured without the wear-resistant filler in the producing method of the fixing belt shown in the WORKING EXAMPLE 1).

Comparative Example 2

A fixing belt was obtained in the same manner as in the WORKING EXAMPLE 1 except that PMDA/ODA of the polyamic acid solution was changed to BPDA/ODA, the thermal conductive filler was changed to graphite (diameter: 8 μm, shape: plate-like) and the graphite was added to the polyamic acid solution so that the graphite occupied 15.0 parts by volume with respect to the solid content of the polyamic acid solution, the wear-resistant filler was changed to silica (diameter: 7 μm, shape: spherical) having an old Mohs hardness of 8 and the silica was added to the polyamic acid solution so that the silica occupied 8.0 parts by volume with respect to the solid content of the polyamic acid solution.

When the physical properties of the obtained fixing belt and the base layer were measured by the same method as that used in the WORKING EXAMPLE 1, the thermal conductivity was 0.92 W/mK, the roughness Rz was 2.23 μm, the piercing strength was 1.0 kgf, and the elongation was 11.6%.

Further, as a result of confirming the degree to be scraped of the base layer after the fixing belt of this working example was incorporated into a fixing device of a printer and the fixing belt was rotated 60000 times in the same manner as that performed in the WORKING EXAMPLE 1, it was confirmed that the fixing belt was scraped to the same extent as the fixing belt that does not include the wear-resistant filler (the fixing belt manufactured without the wear-resistant filler in the producing method of the fixing belt shown in the WORKING EXAMPLE 1).

INDUSTRIAL APPLICABILITY

The fixing belt according to the present invention has a feature that it has the same releasability as before, and that it can suppress a torque increase due to long-tern use by suppressing the scraping of the base layer than before, and further maintains a high thermal conductivity, and can be used as an image fixing device of an image forming device such as a copying machine or a laser beam printer, and a fixing belt, a fixing tube and the like used in the image fixing device thereof.

The invention claimed is:

1. A fixing belt comprising:
a base layer including a polyimide resin;
a thermal conductive filler; and
a wear-resistant filler,
wherein old Mohs hardness of the wear-resistant filler is in a range of 5 or more,
thermal conductivity of the base layer is in a range of 0.7 W/mK or more,
inner surface roughness Rz of the base layer in a sliding direction is in a range of 2.0 μm or less.

2. The fixing belt according to claim 1,
wherein a particle diameter of the wear-resistant filler is in a range from 0.1 μm to 10 μm,
an additive amount of the wear-resistant filler to the base layer is in a range from 0.1 part by volume to 10 parts by volume.

3. The fixing belt according to claim 1,
wherein the wear-resistant filler has a plate-like shape, a needle-like shape, or a spherical shape.

4. The fixing belt according to claim 1,
wherein a particle diameter of the thermal conductive filler is in a range from 0.1 μm to 10 μm,
an additive amount of the thermal conductive filler to the base layer is in a range from 5 parts by volume to 50 parts by volume.

5. The fixing belt according to claim 1,
wherein the old Mohs hardness of the wear-resistant filler is in a range from 5 to 9.

6. The fixing belt according to claim 1,
wherein the thermal conductivity of the base layer is in a range from 0.7 W/mK to 2.5 W/mK.

7. The fixing belt according to claim 1,
wherein the inner surface roughness Rz of the base layer in the sliding direction is in a range from 0.3 μm to 2.0 μm.

8. The fixing belt according to claim 1,
wherein elongation of the base layer is in a range from 2% to 20%.

9. The fixing belt according to claim 1,
wherein piercing strength of the base layer is in a range from 0.9 kgf to 2.0 kgf.

10. The fixing belt according to claim 2,
wherein the wear-resistant filler has a plate-like shape, a needle-like shape, or a spherical shape.

11. The fixing belt according to claim 2,
wherein a particle diameter of the thermal conductive filler is in the range from 0.1 μm to 10 μm, and
an additive amount of the thermal conductive filler to the base layer is in a range from 5 parts by volume to 50 parts by volume.

12. The fixing belt according to claim 3,
wherein a particle diameter of the thermal conductive filler is in a range from 0.1 μm to 10 μm, and
an additive amount of the thermal conductive filler to the base layer is in a range from 5 parts by volume to 50 parts by volume.

13. The fixing belt according to of claim 2,
wherein the old Mohs hardness of the wear-resistant filler is in a range from 5 to 9.

14. The fixing belt according to claim 3,
wherein the old Mohs hardness of the wear-resistant filler is in a range from 5 to 9.

15. The fixing belt according to claim 4,
wherein the old Mohs hardness of the wear-resistant filler is in a range from 5 to 9.

16. The fixing belt according to claim 2,
wherein the thermal conductivity of the base layer is in a range from 0.7 W/mK to 2.5 W/mK.

17. The fixing belt according to claim 3,
wherein the thermal conductivity of the base layer is in a range from 0.7 W/mK to 2.5 W/mK.

18. The fixing belt according to claim 4,
wherein the thermal conductivity of the base layer is in a range from 0.7 W/mK to 2.5 W/mK.

19. The fixing belt according to claim 5,
wherein the thermal conductivity of the base layer is in a range from 0.7 W/mK to 2.5 W/mK.

20. The fixing belt according to claim 2, wherein the inner surface roughness Rz of the base layer in the sliding direction is in a range from 0.3 μm to 2.0 μm.

* * * * *